(12) United States Patent
Gonzalez et al.

(10) Patent No.: US 6,944,986 B1
(45) Date of Patent: Sep. 20, 2005

(54) BAIT CLIPPER

(76) Inventors: Ricardo Gonzalez, 12475 SW. 42 St., Miami, FL (US) 33175; Rafael Perez, 8849 SW. 11 St., Miami, FL (US) 33174

(*) Notice: Subject to any disclaimer, the term of this patent is extended or adjusted under 35 U.S.C. 154(b) by 0 days.

(21) Appl. No.: 10/870,191

(22) Filed: Jun. 18, 2004

(51) Int. Cl.[7] ............................................. A01K 97/00
(52) U.S. Cl. ................................................. 43/4; 7/106
(58) Field of Search .................... 43/1, 4, 4.5, 53.5; 7/106, 125–136

(56) References Cited

U.S. PATENT DOCUMENTS

| 252,563 | A | * | 1/1882 | Wilkins | 7/123 |
|---|---|---|---|---|---|
| 1,552,495 | A | * | 9/1925 | Mohr | 72/409.02 |
| 1,949,452 | A | * | 3/1934 | Chadwick | 294/118 |
| 2,643,151 | A | * | 6/1953 | Zupancic | 294/118 |
| 2,779,123 | A | * | 1/1957 | White | 43/53.5 |
| 2,885,814 | A | * | 5/1959 | Schlador | 43/4 |
| 2,892,285 | A | * | 6/1959 | Shifrin | 43/53.5 |
| 3,201,888 | A | * | 8/1965 | Barbee | 43/4 |
| 3,540,106 | A | * | 11/1970 | Goldman | 29/268 |
| 3,778,919 | A | * | 12/1973 | Simon | 43/53.5 |
| 3,825,961 | A | * | 7/1974 | Klein | 7/106 |
| 3,862,507 | A | * | 1/1975 | Martyn | 43/4 |
| 3,930,329 | A | * | 1/1976 | Burkhardt | 81/423 |
| 4,014,131 | A | * | 3/1977 | Bendik | 43/53.5 |
| 4,057,863 | A | * | 11/1977 | Bewley | 7/132 |
| 4,563,833 | A | * | 1/1986 | Aucoin | 43/54.1 |
| 4,843,753 | A | * | 7/1989 | Mace | 43/4 |
| 5,090,097 | A | * | 2/1992 | Koester et al. | 24/552 |
| 5,421,120 | A | * | 6/1995 | Brumfield | 43/53.5 |
| 5,475,941 | A | * | 12/1995 | Moore | 43/4 |
| 5,822,915 | A | * | 10/1998 | Walker | 43/53.5 |

FOREIGN PATENT DOCUMENTS

GB    2183197    *  6/1987

* cited by examiner

Primary Examiner—Peter M. Poon
Assistant Examiner—David J Parsley
(74) Attorney, Agent, or Firm—Jesus Sanchelima; Albert Bordas

(57) ABSTRACT

A clipper for cutting and severing a portion of bait material preventing direct contact of a user with the former. The two elongated pivotally mounted members include cutting assemblies ends that cooperate to come towards each other in a substantially parallel fashion. Peripheral walls with distal sharpened edges have to cut into a bait severing a portion that is lodged between complementing cavities formed by the peripheral walls. Slots in the base plates extend towards their respective centers upon which the peripheral wall are perpendicularly mounted permit a user to manipulate a fishing hook. The hook is removed through one of the cutouts in the peripheral walls that coincide with the entrance to the slots. A user can then hold the bait portion with one hand while safely manipulating the hook with the other hand to set his/her fishing bait.

3 Claims, 2 Drawing Sheets

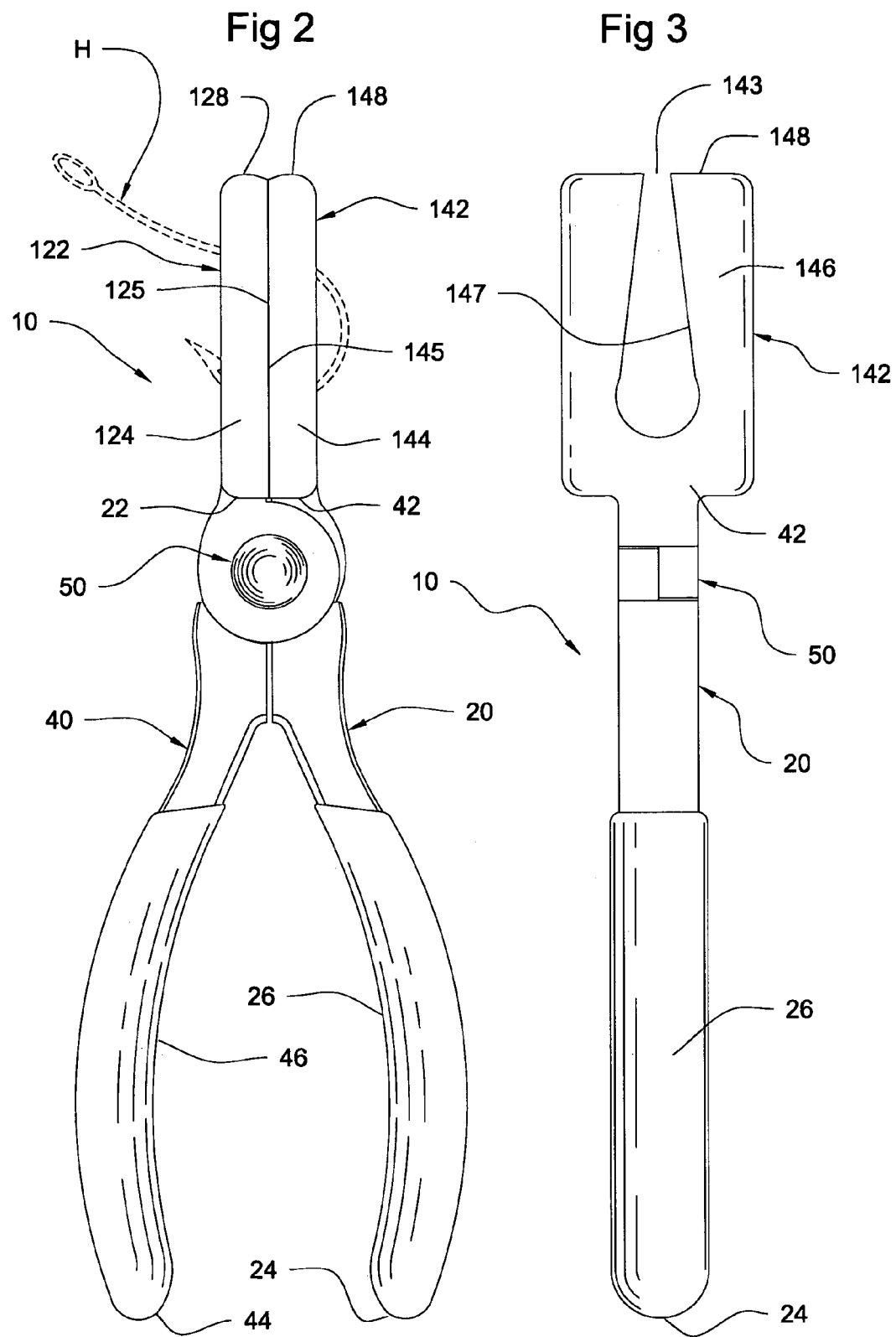

BAIT CLIPPER

BACKGROUND OF THE INVENTION

1. Field of the Invention

The present invention relates to bait clippers, and more particularly, to such clippers that can readily cut out a piece of bait from a larger body and provide support for releasably holding the resulting bait portion for inserting a fishing hook.

2. Description of the Related Art

Several devices have been designed in the past to facilitate placing a bait on a fishing hook. None of them, however, includes a clipper that can readily cut away a portion of a body of bait and permit a user to engage a hook while readily permitting the release of the combination afterwards.

Typically a user has to come in contact with the bait requiring him/her to wash his/her hands frequently. Additionally, not infrequently this direct contact with the fishing hook and bait results in injuring.

SUMMARY OF THE INVENTION

It is one of the main objects of the present invention to provide a device for cutting a portion of bait with a predetermined design and dimensions.

It is another object of the present invention to provide a device that can support a bait portion for releasably engaging a fishing hook without requiring direct contact by the user.

It is yet another object of this invention to provide such a device that is inexpensive to manufacture and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which:

FIG. 2 is a side elevation view of the device represented in FIG. 1.

FIG. 3 shows a front elevational view of the device represented in previous figures.

DETAILED DESCRIPTION OF THE PREFERRED EMBODIMENT

Figure 1:
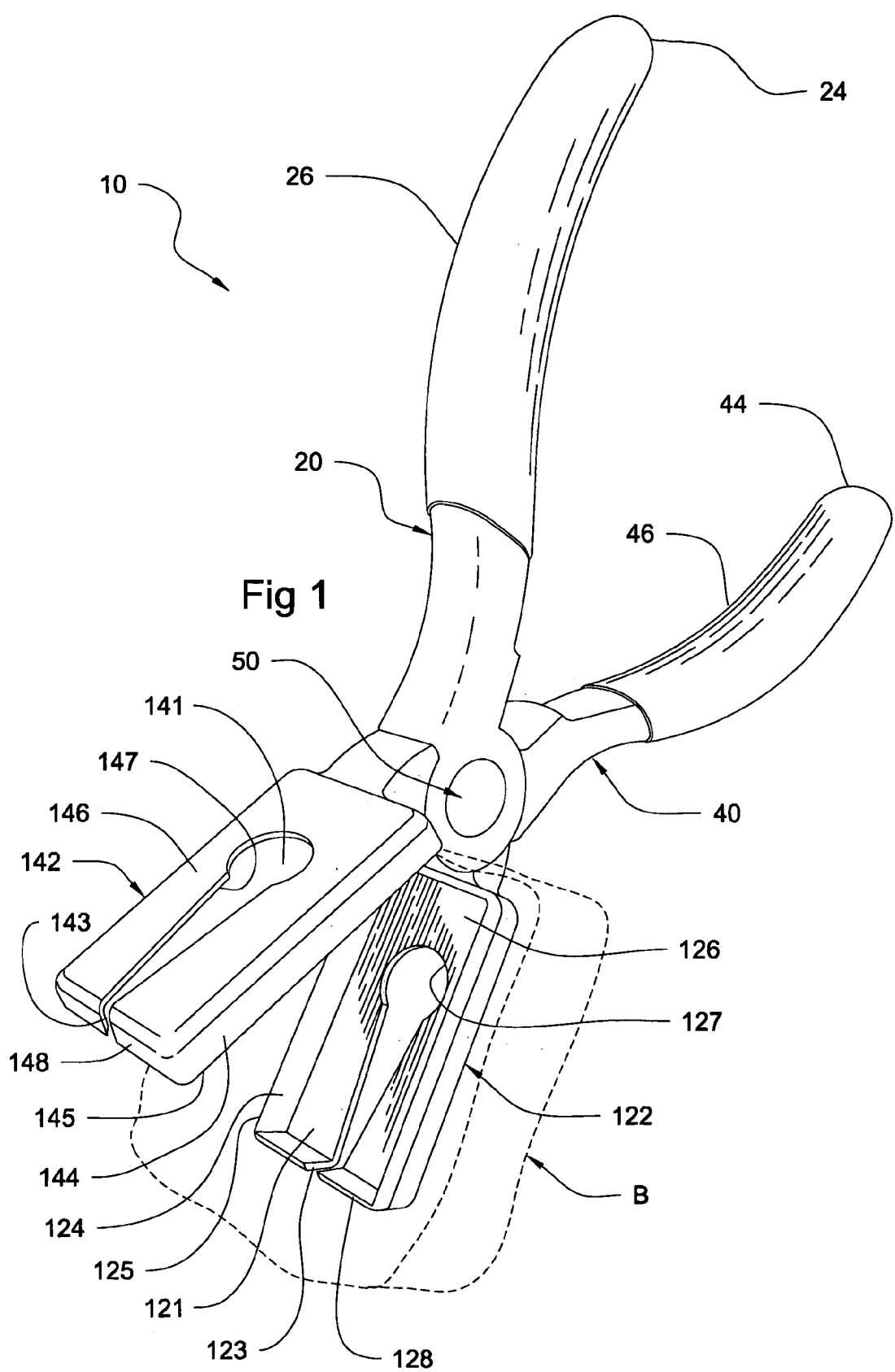
FIG. 1 represents an isometric view of one of the embodiments for the present invention.

Referring now to the drawings, where the present invention is generally referred to with numeral 10, it can be seen that it basically includes two elongated members 20 and 40 that are pivotally mounted to each other at pivoting point 50, substantially like a conventional pliers.

Member 20 includes ends 22 and 24 and member 40 includes ends 42 and 44. Ends 24 and 44 of members 20 and 40 include handle portions 26 and 46, respectively, that coact with the user's hand to provide a firm grip on the device. Ends 22 and 42 include cutting assemblies 122 and 142 that are substantially symmetrical and coact with each other when they are brought together to cut a portion of bait "B"(shown in phantom), as best seen in FIG. 1.

In the preferred embodiment, and as it can be seen in FIG. 1, cutting assemblies 122 and 142 define rectangular cavities 121 and 141 with peripherally extending walls 124 and 144 mounted to a base plates 126 and 146, respectively. Walls 124 and 144 are perpendicularly mounted to base plates 126 and 146, respectively, and their peripheral edges 125 and 145 are sharpened. Upon the application of a force having a predetermined magnitude, edges 125 and 145 are brought against each other and cut into bait "B" thereby severing a portion that substantially conforms to complementing cavities 121 and 141 designed by cutting assemblies 122 and 142. Walls 124 and 144 have cutouts 123 and 143, peripherally at their respective front ends 128 and 148. Clip base plates 126 and 146 have longitudinal slots 127 and 147, respectively, that in the preferred embodiment are enlarged towards the centers of base plates 126 and 146. These enlarged portions are intended to facilitate the insertion of hook H, as best seen in FIG. 2. Cutouts 123 and 143 cooperatively coincide with the narrow (distal) portion of slots 127 and 147, respectively.

To use bait clipper 10, a user positions cutting assemblies 122 and 142 above and below bait "B" and applies pressure on handle portions 26 and 46. Sharp peripheral edges 125 and 145 are brought against each other cutting a portion of bait "B" that conforms to the complementing space defined by cavities 121 and 141. While holding the severed portion a user inserts the end of a conventional fishing hook H through slot 127 and 147 and into one side of bait "B", rotates the shank of hook H and presses it against the other side of bait "B". Once hook H is set on the portion of bait "B" the latter is released from clipper 10. The user had no contact with bait "B" itself and safely pierced bait "B".

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A bait clipper, comprising:

A) first and second elongated members, each having first and second ends, and said first and second elongated members being pivotally mounted to each other at a point between said first and second ends;

B) first and second cutting assemblies mounted at said first ends, each of said cutting assemblies including a base plate member with a peripheral edge having a slot that extends from said peripheral edge defining an entrance and towards the center of said base plate member and each of said base plate members further including a peripherally extending wall perpendicularly mounted thereon, said peripherally extending walls having each a peripheral sharpened edge that coact with each other when brought together to cut into and sever a portion of a bait, said portion of a bait conforming to the peripheral configuration of said peripherally extending walls and said peripherally extending walls including cut-outs that cooperatively coincide with said entrance; and C) hook means having a substantially J-shape, so that it can be inserted through said severed portion of a bait supported by said cutting assemblies.

2. The clipper set forth in claim 1 where in said first ends are brought against each other in a substantially parallel relationship with respect to each other so that said peripheral sharpened edges come in cutting contact with respect to each other substantially at the same time.

3. The clipper set forth in claim 2 wherein said peripheral walls define substantially rectangular cavities.

* * * * *